United States Patent [19]

Nio et al.

[11] Patent Number: 5,510,847
[45] Date of Patent: Apr. 23, 1996

[54] TV SIGNAL DECODING APPARATUS USING LUMINANCE AND COLOR SIGNAL SELECTION

[75] Inventors: Yutaka Nio, Osaka; Ryuji Matsuura, Neyagawa, both of Japan

[73] Assignee: Matsushita Electric Industrial Co., Ltd., Kadoma, Japan

[21] Appl. No.: 374,067

[22] Filed: Jan. 19, 1995

[30] Foreign Application Priority Data

Jan. 28, 1994 [JP] Japan .................................. 6-008251

[51] Int. Cl.$^6$ .................................................. H04N 7/00
[52] U.S. Cl. .................................. 348/554; 348/549
[58] Field of Search .................................. 348/554, 557, 348/560, 432, 436, 389, 556, 726, 426, 913, 536, 540, 547, 549, 450, 441, 427, 429, 434, 435, 473, 474, 476, 479, 663; H04N 7/00

[56] References Cited

U.S. PATENT DOCUMENTS 5,353,065 10/1994 Katsumata et al. ............... 348/556
5,387,939 2/1995 Naimpally ....................... 348/433

*Primary Examiner*—James J. Groody
*Assistant Examiner*—Nina N. West
*Attorney, Agent, or Firm*—Ratner & Prestia

[57] ABSTRACT

The object of the present invention is to use signal decoding circuits for a first generation EDTV signal and a second generation EDTV signal in common and to suppress an increase of circuit scale.

An EDTV signal decoding apparatus of the present invention is constructed with a cascade connection of a first A/D converter, a first signal processing circuit, a first D/A converter, a second A/D converter, a second signal processing circuit and a second D/A converter. The first group composed of the first A/D converter, the first signal processing circuit and the first D/A converter are driven by a clock signal synchronizing with a color burst signal. The second group composed of the second A/D converter, the second signal processing circuit and the second D/A converter are driven by a clock signal synchronizing with a horizontal sync signal.

At the first signal processing circuit, a composite video signal is inputted and when a signal discrimination and control circuit judges that a vertical high frequency band helper signal is not multiplexed in upper/lower non-picture periods with the input signal or a vertical high frequency band helper signal is multiplexed in upper/lower non-picture periods but the input signal is in a picture period, a demodulator input signal selector, a luminance signal output selector and I and Q signal output selectors are controlled to be the upper positions and a chrominance signal separated at a three dimensional adaptive type Y/C separator is demodulated at a color demodulator. A luminance signal separated at the three dimensional adaptive type Y/C separator is outputted from a luminance signal output terminal and color signals I and Q demodulated at the color demodulator are outputted from I and Q signal output terminals, respectively.

8 Claims, 5 Drawing Sheets

| HH signal | VII signal | * | SELECTOR NO. | | | |
|---|---|---|---|---|---|---|
| | | | FIG. 3 | | FIG. 4 | |
| | | | 20/27 | 19/21/25/26 | 20/27 | 19/25/26/34/35 |
| yes | yes | P | U | U | U | U |
| | | N-P | U | L | U | L |
| no | yes | P | L | U | L | U |
| | | N-P | L | L | L | L |
| yes | no | | U | U | U | U |
| no | no | | L | U | L | U |

FIG. 6

HH signal: Horizontal high frequency band helper signal
VH signal: Vertical high frequency band Helper signal
Yes: is multiplexed
no: is not multiplexed
*: where is the present instant?
P: in the picture period
N-P: in the upper/lower non-picture periods
U: upper position
L: lower position

TV SIGNAL DECODING APPARATUS USING LUMINANCE AND COLOR SIGNAL SELECTION

BACKGROUND OF THE INVENTION (1) Field of the Invention

The present invention relates to an EDTV signal decoding apparatus which signal has a compatibility with a current NTSC signal and is transmitted by a letter box format multiplexed with video helper signals.

(2) Description of the Prior Art

Recently, according to spread of large screen television receivers, high definition pictures are absolutely required and EDTV (Enhanced Definition Television) system which executes a high picture quality processing at both transmitter side and receiver side has been studied.

Figure 1:
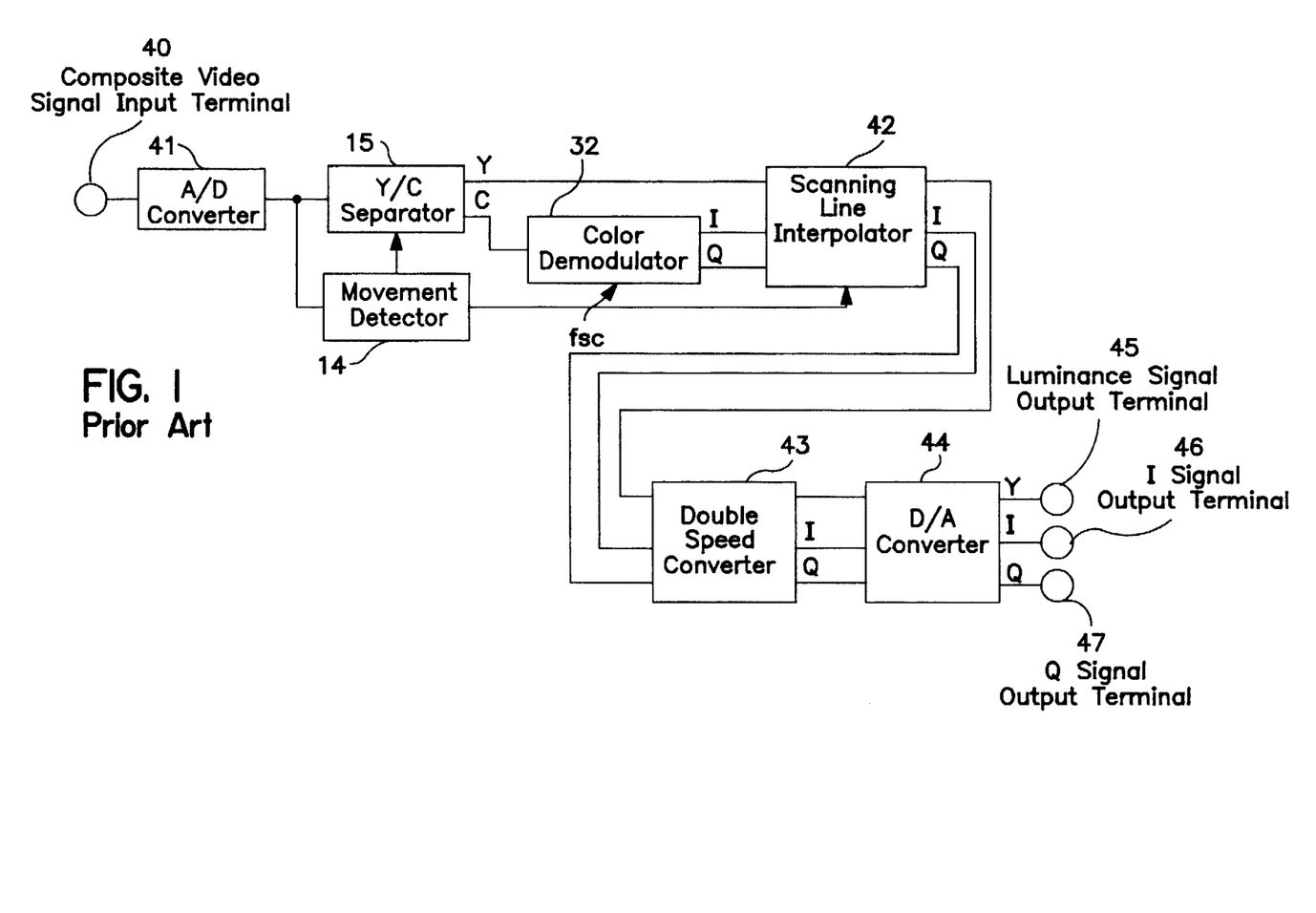
FIG. 1 is a block diagram of an EDTV signal decoding apparatus only for a first generation EDTV signal in accordance with the prior art.

A configuration of a decoding apparatus for a current EDTV signal (first generation EDTV, hereafter) is described in detail on pages 129–181 of a Clearvision Handbook published by Clearvision Spread Promotion Consulting Committee (Japan). A block diagram of an EDTV signal decoding apparatus for a first generation EDTV system in accordance with the prior art is shown in FIG. 1.

A composite video signal inputted from a composite video signal input terminal 40 is converted into a digital signal at an A/D converter 41 and is separated to a luminance signal Y and a chrominance signal C at a three dimensional adaptive type Y/C separator 15 according to a movement signal detected at a movement detector 14. The chrominance signal C is demodulated to an I signal and a Q signal at a color demodulator 32 and interpolating scanning lines are generated at a scanning line interpolator 42 for the luminance signal Y and the color signals I and Q. Then the horizontal scanning frequencies of the signals Y, I and Q are doubled at a double speed converter 43, the output signals of the double speed converter 43 are converted into analog signals at a D/A converter 44 and the luminance signal Y, the color signals I and Q are outputted from a luminance signal output terminal 45, an I signal output terminal 46 and a Q signal output terminal 47, respectively.

A second generation EDTV signal, however, is a video signal having a letter box format and a horizontal high frequency band helper signal (HH) is multiplexed with a video signal and an interpolating scanning line helper signal or a vertical high frequency band helper signal (VH) is multiplexed during upper/lower non-picture periods and displays a picture on a screen having a 16:9 aspect ratio by adding a second generation EDTV signal decoding apparatus to a video signal circuit. As a result, the number of circuit components and parts composing a second generation EDTV signal decoding apparatus is much larger than that of a first generation EDTV signal decoding apparatus and a circuit scale of the second generation EDTV signal decoding apparatus increases much more than that of the first generation EDTV signal decoding apparatus.

SUMMARY OF THE INVENTION

To solve the above problems, the present invention offers an EDTV signal decoding apparatus which is common for a first and a second generation EDTV systems and can suppress an increase of a circuit scale and power consumption by simplifying a configuration of a second generation EDTV signal decoding apparatus and by using a part of circuits for regenerating helper signals peculiar to the second generation EDTV system and that of the first generation EDTV system in common or by selecting an additional circuit.

An EDTV signal decoding apparatus in accordance with an exemplary embodiment of the present invention uses a color demodulator and a demodulator for a vertical high frequency band helper signal in common and includes an input signal selector for a demodulator controlled by what kind of signal the input signal is and in which period the input signal is a picture period or upper/lower non-picture periods, and an output signal selector for a luminance signal output and a color signal controlled by what kind of signal the input signal is and in which period the input signal is a picture period or upper/lower non-picture periods.

In an EDTV signal decoding apparatus in accordance with an exemplary embodiment of the present invention, video processing such as three dimensional adaptive type Y/C separation, separation between a horizontal high frequency band helper signal and a chrominance signal (F/C separation), demodulation of a horizontal high frequency band helper signal, restoration of a horizontal high frequency band signal on the luminance signal, color demodulation, and demodulation of a helper signal multiplexed during upper/lower non-picture periods is executed by a clock signal synchronizing with a color burst signal. Processing such as threefold expansion (at time base) of a demodulated vertical high frequency band helper signal (VH signal) multiplexed during upper/lower non-picture periods, separation between an interpolating line helper signal and a vertical high frequency band helper signal, scanning line interpolation, addition of a vertical high frequency band helper signal (VH signal), and vertical expansion (interpolation of scanning lines during a picture period) is executed by a clock signal synchronizing with a horizontal sync signal.

Especially at a block performing with a clock signal synchronizing with a color burst signal, a color demodulator and a demodulator for a vertical high frequency band helper signal are used in common and when the video input signal is an NTSC signal or a second generation EDTV signal and is in a picture period, the demodulator outputs color signals I and Q by a clock signal synchronizing with the color burst signal. A luminance signal Y separated at the three dimensional adaptive type Y/C separator is outputted from a luminance signal output terminal and color signals I and Q from the above-mentioned demodulator are outputted from color signal output terminals.

When the video input signal is a second generation EDTV signal and is in upper/lower non-picture periods, a composite video signal before being separated at the three dimensional adaptive type Y/C separator is inputted to the color demodulator, a demodulated signal at the demodulator working with a clock signal synchronizing with the color burst signal is outputted from the luminance signal output terminal and DC levels without color signal are outputted from the color signal output terminals.

DETAILED DESCRIPTION OF THE INVENTION

Figure 2:
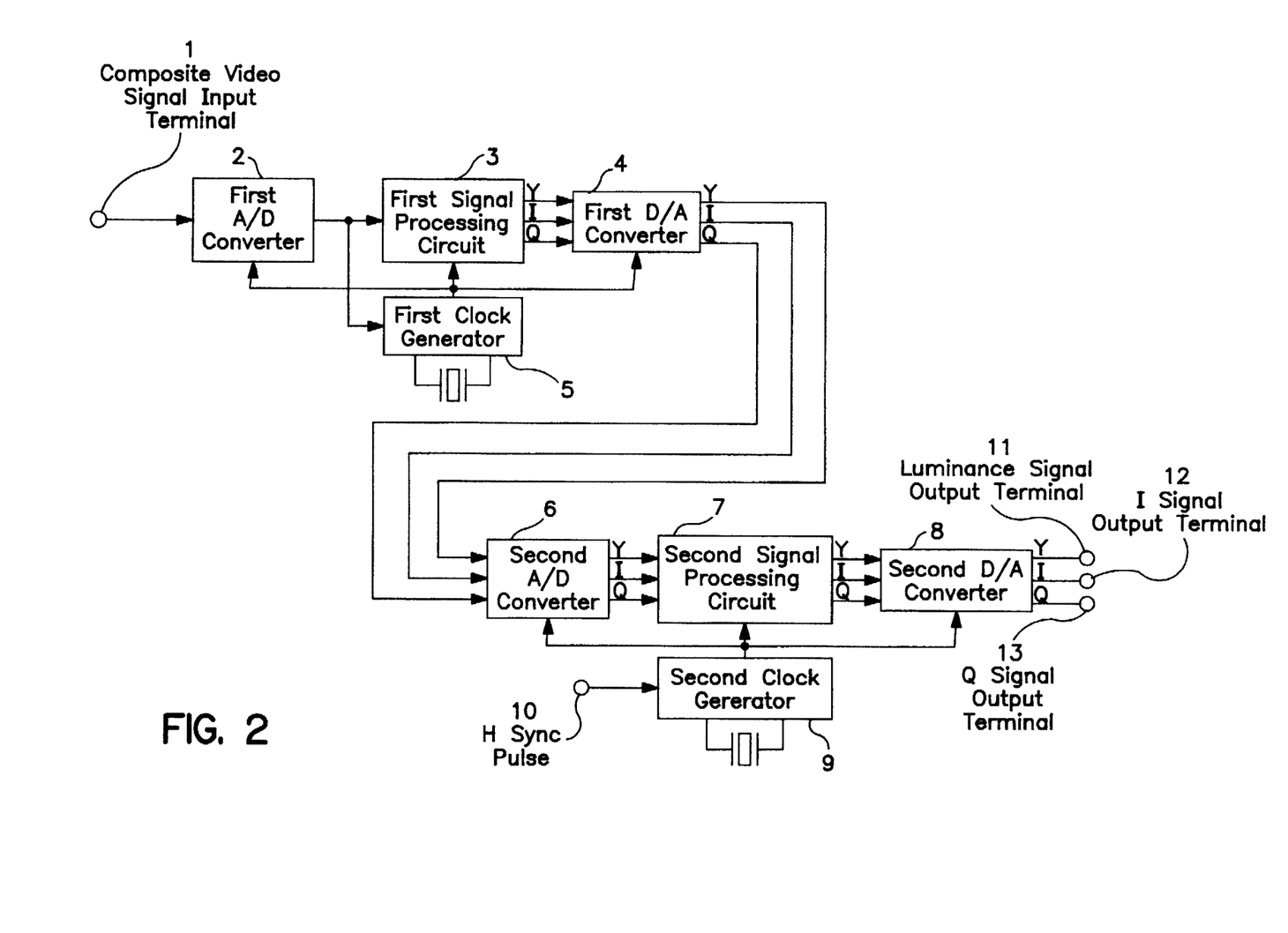
FIG. 2 is a block diagram of an EDTV signal decoding apparatus in accordance with an exemplary embodiment of the present invention.

A block diagram of an EDTV signal decoding apparatus in accordance with an exemplary embodiment of the present invention is shown in FIG. 2. When a composite video signal is applied to an input terminal 1, a clock signal having a fourfold frequency of a color burst signal and synchronizing with the color burst signal is generated at a first clock generator 5. The composite video input signal is converted into a digital signal by the clock signal generated at the first clock generator 5. The digitalized composite video signal is applied to a first signal processing circuit 3, is converted into a luminance signal Y and two color signals I and Q and these three signals are converted into analog signals at a first D/A converter 4 working with the clock signal generated at the first clock generator 5 and are converted again into digital signals at a second A/D converter 6 working with a clock signal generated at a second clock generator 9 synchronizing with a horizontal sync signal and are inputted to a second signal processing circuit 7.

Figure 5A:
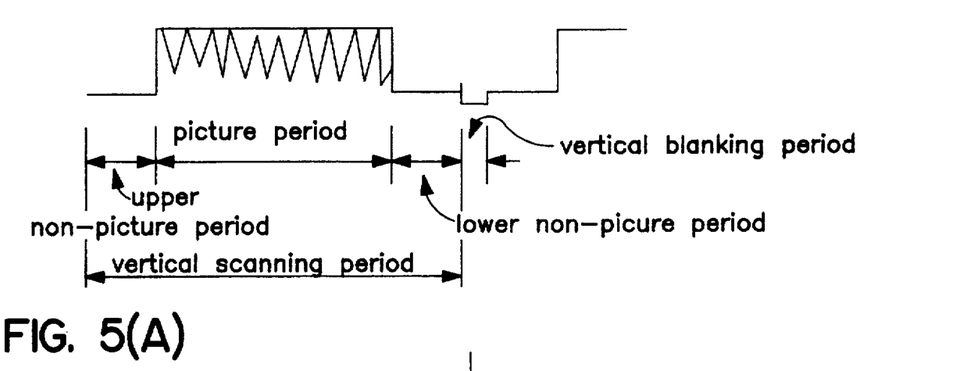
FIGS. 5(a) & (b) show a second generation EDTV signal and its displayed picture on a screen, respectively.
Figure 5B:
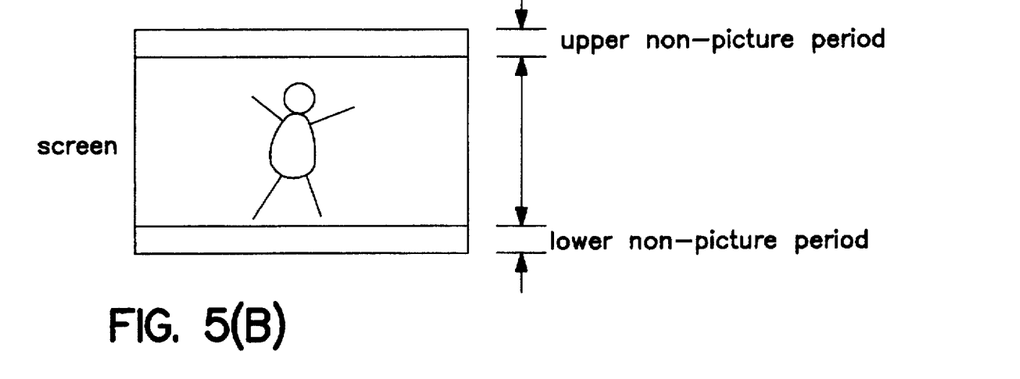

At the second signal processing circuit 7, video processing such as regeneration of a vertical high frequency band helper signal multiplexed during upper/lower non-picture periods (shown in FIG. 5), scanning line interpolation, vertical expansion, double speed conversion which doubles a horizontal scanning frequency is executed by a clock signal from the second clock generator 9. A luminance signal Y and color signals I and Q processed at the second signal processing circuit 7 are converted into analog signals by a clock signal generated at the second clock generator 9 and synchronizing with the horizontal sync signal at a second D/A converter 8 and a luminance signal Y and color signals I and Q are outputted from a luminance signal output terminal 11, I signal output terminal 12 and Q signal output terminal 13, respectively.

Figure 3:
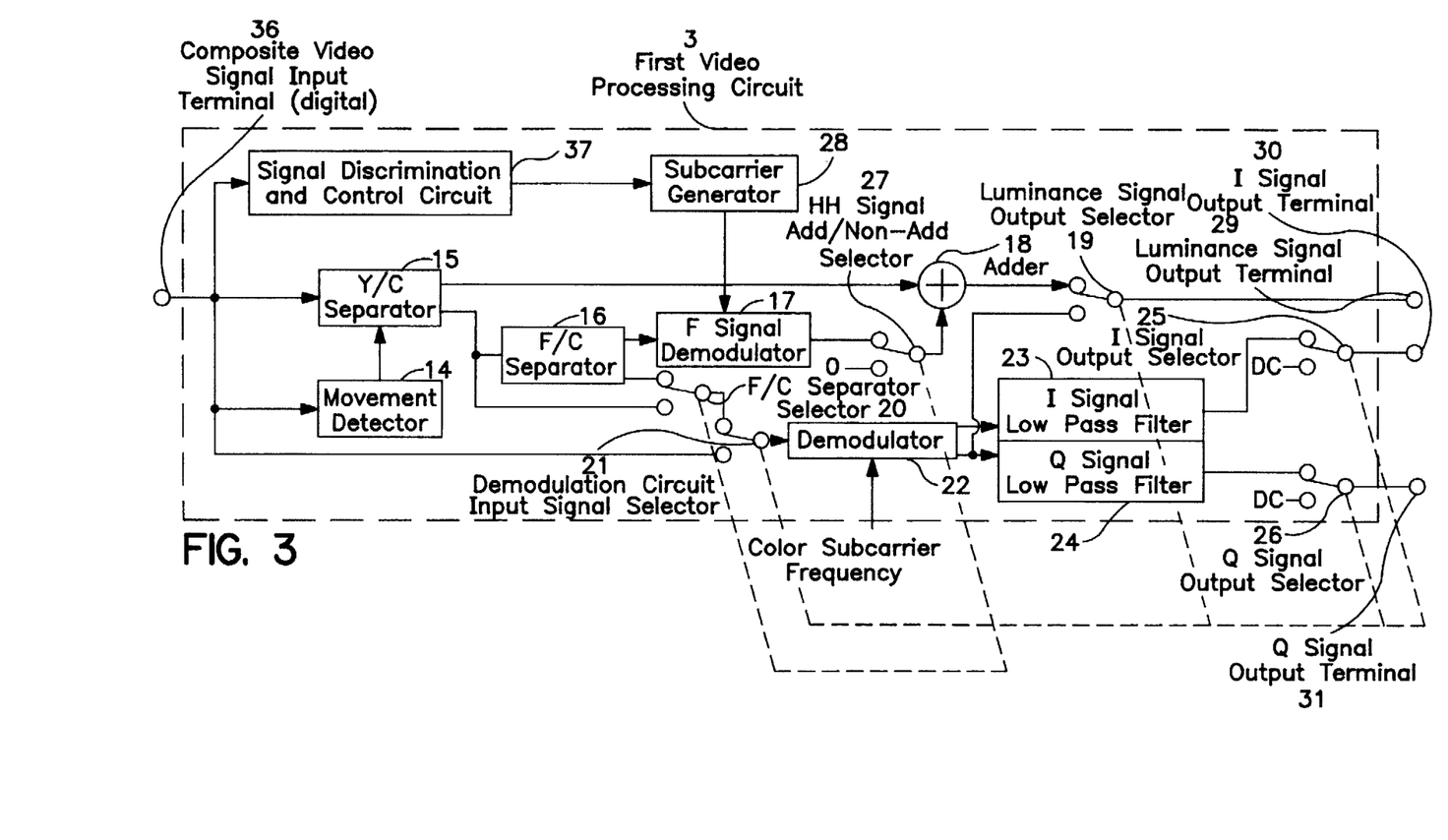
FIG. 3 is a block diagram of an example of a first signal processing circuit used in an EDTV signal decoding apparatus in accordance with the exemplary embodiment of the present invention.
Figure 4:
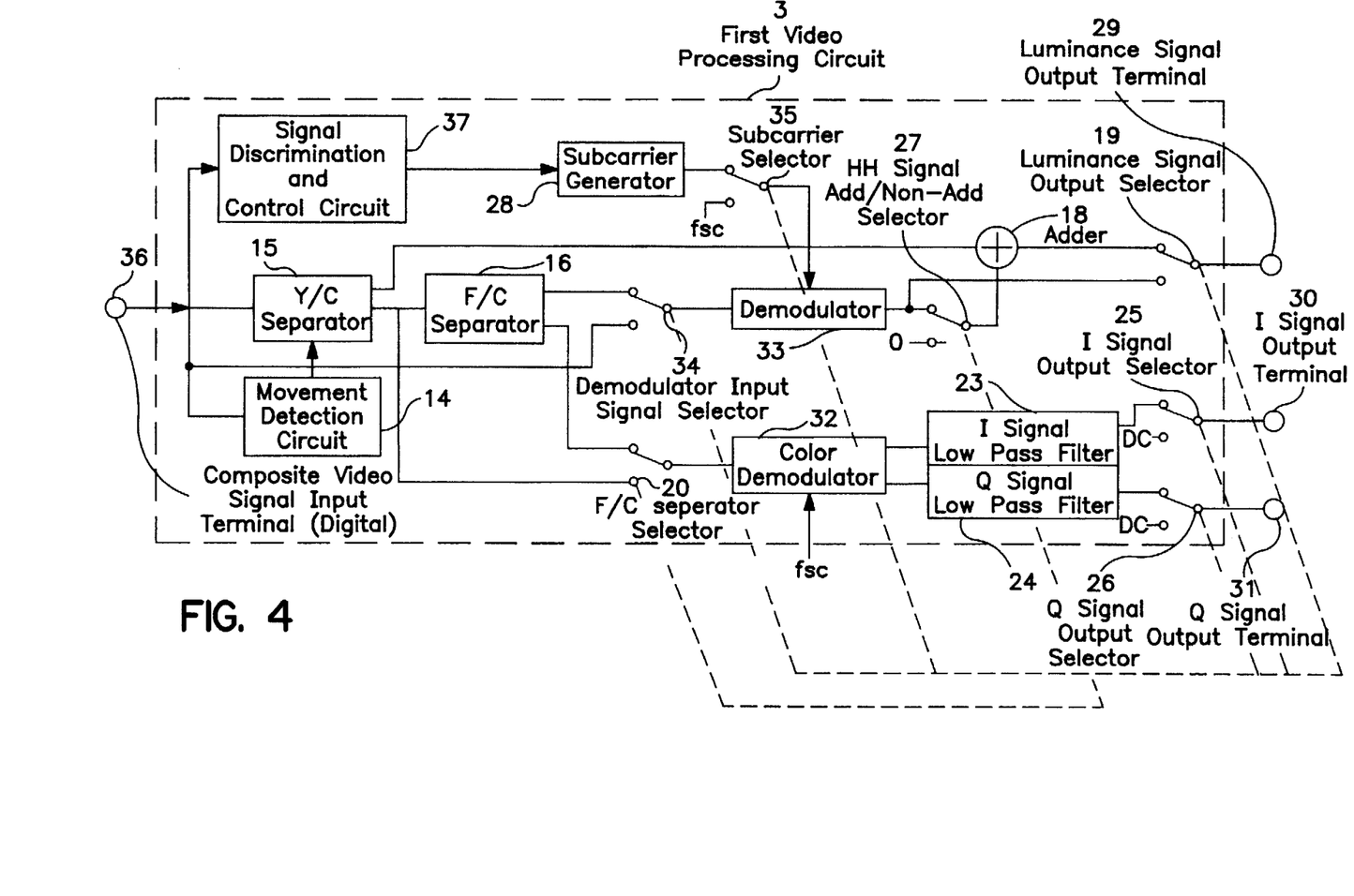
FIG. 4 is a block diagram of another example of a first signal processing circuit used in an EDTV signal decoding apparatus in accordance with the exemplary embodiment of the present invention.

Two examples of the first signal processing circuits used in an EDTV signal decoding apparatus in accordance with the exemplary embodiment of the present invention are shown in FIGS. 3 and 4.

FIG. 3 is an example in which a color demodulator and a demodulator for a vertical high frequency band helper signal are used in common. FIG. 4 is another example in which a demodulator for a horizontal high frequency band helper signal and a demodulator for a vertical high frequency band helper signal are used in common.

A performance of a signal processing circuit using a color demodulator and a demodulator for a vertical high frequency band helper signal in common is explained in the following, referring to FIG. 3.

A second or a first generation EDTV signal or an NTSC signal is applied to a composite video signal input terminal 36. The input signal is a digital signal. The video input signal is applied to a signal discrimination and control circuit 37. The signal discrimination and control circuit 37 judges if there is a discrimination signal multiplexed on the scanning lines and the signal contents (what kind of signal) and generates control signals for controlling selectors 19, 20, 21, 25, 26 and 27 and a reference signal for generating a subcarrier for demodulating a horizontal high frequency band helper signal. (cf: In a second generation EDTV system, the discrimination signal is multiplexed during the 22nd and 285th horizontal scanning periods. A horizontal high frequency band helper signal (HH signal) is multiplexed during a picture period (shown in FIG. 5) and a vertical high frequency band helper signal (VH signal) is multiplexed during upper/lower non-picture periods (shown in FIG. 5).) Receiving the reference signal, a subcarrier generator 28 generates a subcarrier signal for demodulating a horizontal high frequency band helper signal. A three dimensional adaptive type Y/C separator 15 switching between a frame comb filter and a line comb filter separates a video input signal to a luminance signal Y and a chrominance signal C according to a movement detection signal from a movement detector 14.

When the signal discrimination and control circuit 37 judges that a horizontal high frequency band helper signal is multiplexed in the input signal, the signal discrimination and control circuit 37 controls an F/C separator selector 20 and an HH signal add/non-add selector 27 to be on the upper positions.

When the signal discrimination and control circuit 37 judges that a horizontal high frequency band helper signal is not multiplexed, the signal discrimination and control circuit 37 controls the F/C separator selector 20 and the HH signal add/non-add selector 27 to be on the lower positions.

When the signal discrimination and control circuit 37 judges that a vertical high frequency band helper signal is not multiplexed or a vertical high frequency band helper signal is multiplexed in the input signal and the present instant is in a picture period, the signal discrimination and control circuit 37 controls selectors 19, 21, 25 and 26 to be on the upper positions.

Figure 6:
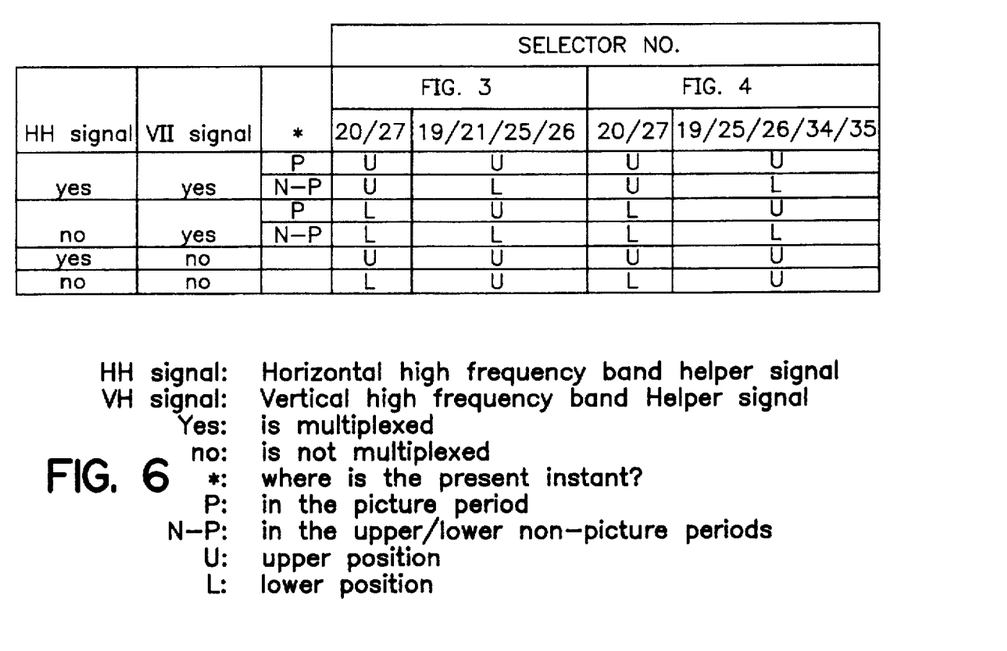
FIG. 6 is a table showing switch positions of selectors against the input signal at the two examples of a first signal processing circuit used in an EDTV signal decoding apparatus in accordance with the exemplary embodiment of the present invention.

Which position is each selector on the upper or the lower against that a horizontal high frequency band helper signal and a vertical high frequency band helper signal exists or not and which is the present instant in a picture period or in upper/lower non-picture periods is shown in a table of FIG. 6.

When the signal discrimination and control circuit 37 judges that a vertical high frequency band helper signal is multiplexed and the present instant is in upper/lower non-picture periods, the signal discrimination and control circuit 37 controls selectors 19, 21, 25 and 26 to be on the lower positions.

Therefore, when a horizontal high frequency band helper signal is multiplexed during a picture period and a vertical high frequency band helper signal is multiplexed during upper/lower non-picture periods and the present instant is in a picture period or when only a horizontal high frequency band helper signal is multiplexed and a vertical high frequency band helper signal is not multiplexed, the selectors 20, 27, 19, 21, 25 and 26 are all on the upper positions, independent of in which period of picture or upper/lower non-picture the present instant is.

The F/C separator 16 separates a chrominance signal separated at the Y/C separator 15 into a modulated horizontal high frequency band helper signal (F signal) and a chrominance signal C. The separated horizontal high frequency band helper signal F is demodulated at the F signal demodulator 17 with a subcarrier signal generated at the subcarrier generator 28 and is added at the adder 18 to a luminance signal separated at the Y/C separator 15 and is outputted from the luminance signal output terminal 29 through the selector 19.

The chrominance signal separated at the F/C separator 16 is lead to the demodulator 22 through the selectors 20 and 21 and is demodulated into two color signals I and Q with a subcarrier signal synchronizing with a color burst signal at the demodulator 22 and the demodulated color signals I and Q are outputted from the output terminals 30 and 31 through the low pass filters 23 and 24 and the selectors 25 and 26, respectively.

When only a vertical high frequency band helper signal is multiplexed and a horizontal high frequency band helper signal is not multiplexed and the present instant is in a picture period or when neither a horizontal high frequency band helper signal nor a vertical high frequency band helper signal is multiplexed, the selectors 20 and 27 are on the lower positions and the selectors 19, 21, 25 and 26 are on the upper positions, independent of in which period of picture or non-picture the input signal is.

In this case, because the selector 27 is on the lower position, the adder 18 adds zero value to the luminance signal outputted from the Y/C separator 15 and the luminance signal separated at the Y/C separator 15 is outputted from the luminance signal output terminal 29 as it is.

The chrominance signal separated at the Y/C separator 15 is lead to the demodulator 22 through the selectors 20 and 21 and is demodulated at the demodulator 22 into two color signals I and Q with a subcarrier signal synchronizing with a color burst signal and the demodulated I and Q signals are outputted from the color output terminals 30 and 31 through the low pass filters 23 and 24 and the selectors 25 and 26, respectively.

When a vertical high frequency band helper signal is multiplexed and the present instant is in upper/lower non-picture periods, the selectors 19, 21, 25 and 26 are on the lower positions independent of if there is a horizontal high frequency band helper signal or not. In this case, the output signals at the signal output terminals are independent of the upper or lower position of the selectors 20 and 27.

A vertical high frequency band helper signal is demodulated from the video input signal at the demodulator 22 and is outputted from the luminance signal output terminal 29 through the selector 29, DC level signals without color signal is outputted from the I and Q signal output terminals 30 and 31. The demodulator 22 demodulates a chrominance signal when the input signal is in a picture period and demodulates a modulated vertical high frequency band helper signal when the input signal is in upper/lower non-picture periods and these two kinds of demodulations are made by time sharing by the selector 21.

A performance of another example of a first signal processing circuit using demodulators for horizontal and vertical high frequency band helper signals in common is explained in the following, referring to FIG. 4.

A second or a first generation EDTV signal or an NTSC signal is applied to a composite video signal input terminal 36. The input signal is a digital signal. The video input signal is applied to a signal discrimination and control circuit 37. The signal discrimination and control circuit 37 judges if there is a discrimination signal or not and the signal contents (what kind of signal) and generates control signals for controlling selectors 19, 20, 25, 26, 27 and 34 and a reference signal for generating a subcarrier for demodulating a horizontal high frequency band helper signal. Receiving the reference signal, a subcarrier generator 28 generates a subcarrier signal for demodulating a horizontal high frequency band helper signal. A three dimensional adaptive type Y/C separator 15 switching between a frame comb filter and a line comb filter separates a video input signal to a luminance signal Y and a chrominance signal C according to a movement detection signal from a movement detector 14.

When the signal discrimination and control circuit 37 judges that a horizontal high frequency band helper signal is multiplexed in the input signal, the signal discrimination and control circuit 37 controls an F/C separator selector 20 and an HH signal add/non-add selector 27 to be on the upper positions.

When the signal discrimination and control circuit 37 judges that a horizontal high frequency band helper signal is not multiplexed, the signal discrimination and control circuit 37 controls the selectors 20 and 27 to be on the lower positions.

When the signal discrimination and control circuit 37 judges that a vertical high frequency band helper signal is not multiplexed or a vertical high frequency band helper signal is multiplexed in the input signal and the present instant is in a picture period, the signal discrimination and control circuit 37 controls the selectors 19, 25, 26, 34 and 35 to be on the upper positions.

Which position is each selector on the upper or the lower against that a horizontal high frequency band helper signal and a vertical high frequency band helper signal exist or not and which is the present instant in a picture period or in upper/lower non-picture periods is shown in a table of FIG. 6.

When the signal discrimination and control circuit 37 judges that a vertical high frequency band helper signal is multiplexed and the present instant is in upper/lower non-picture periods, the signal discrimination and control circuit 37 controls selectors 19, 25, 26, 34 and 35 to be on the lower positions.

Therefore, when both horizontal and vertical high frequency band helper signals are multiplexed and the present instant is in a picture period or when only a horizontal high frequency band helper signal is multiplexed and a vertical high frequency band helper signal is not multiplexed, the selectors 19, 20, 25, 26, 27, 34 and 35 are all on the upper positions, independent of in which period of picture or upper/lower non-picture the input signal is.

The F/C separator 16 separates a signal outputted from the Y/C separator 15 into a modulated horizontal high frequency band helper signal (F signal) and a chrominance signal C. The separated horizontal high frequency band helper signal F (modulated HH signal) is demodulated at the F signal demodulator 17 with a subcarrier signal generated at the subcarrier generator 28 and is added at the adder 18 to a luminance signal separated at the Y/C separator 15 and is outputted from the luminance signal output terminal 29 through the selector 19.

The chrominance signal separated at the F/C separator 16 is lead to the color demodulator 32 through the selector 20 and is demodulated into two color signals I and Q with a subcarrier signal synchronizing with a color burst signal at the color demodulator 32 and the demodulated color signals I and Q are outputted from the output terminals 30 and 31 through the low pass filters 23 and 24 and the selectors 25 and 26, respectively.

When only a vertical high frequency band helper signal is multiplexed and a horizontal high frequency band helper signal is not multiplexed and the present instant is in a picture period or when neither a horizontal high frequency band helper signal nor a vertical high frequency band helper signal is multiplexed, the selectors 20 and 27 are on the lower positions and the selectors 19, 25, 26, 34 and 35 are on the upper positions, independent of in which period of picture or upper/lower non-picture the input signal is.

In this case, because the selector 27 is on the lower position, the adder 18 adds zero value to the luminance signal outputted from the Y/C separator 15 and the luminance signal separated at the Y/C separator 15 is outputted from the luminance signal output terminal 29 as it is.

The chrominance signal separated at the Y/C separator 15 is lead to the color demodulator 32 through the selectors 20 and is demodulated at the color demodulator 32 into two color signals I and Q with a subcarrier signal synchronizing with a color burst signal and the demodulated I and Q signals are outputted from the output terminals 30 and 31 through the low pass filters 23 and 24 and the selectors 25 and 26, respectively.

When a vertical high frequency band helper signal is multiplexed and the present instant is in upper/lower non-picture periods, the selectors 19, 25, 26, 34 and 35 are on the lower positions, independent of if there is a horizontal high frequency band helper signal or not. In this case, the output signals at the signal output terminals are independent of the upper or lower positions of the selectors 20 and 27.

A vertical high frequency band helper signal is demodulated from the video input signal at the demodulator 33 and is outputted from the luminance signal output terminal 29 through the selector 19. DC level signals without color signal is outputted from the I and Q signal output terminals 30 and 31.

The demodulator 33 demodulates a modulated horizontal high frequency band helper signal when the input signal is in a picture period and demodulates a modulated vertical high frequency band helper signal when the input signal is in upper/lower non-picture periods and these two kinds of demodulations are made by time sharing by the selector 34.

As explained above, an EDTV signal decoding apparatus in accordance with an exemplary embodiment of the present invention can use a vertical high frequency helper signal demodulator and a color demodulator in common or a horizontal high frequency helper signal demodulator and a vertical high frequency helper signal demodulator in common by dividing a composite video signal processing into a processing based on a clock signal synchronizing with a color burst signal and a processing based on another clock signal synchronizing with a horizontal sync signal. As a result, the increase of the circuit scale can be suppressed.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An TV signal decoding apparatus comprising:
   (1) first A/D conversion means for converting a composite video input signal into a digital signal synchronizing with a color burst signal;
   (2) first signal processing means for processing of three dimensional adaptive type Y/C separation, color demodulation, horizontal high frequency band helper signal separation, subcarrier generation for demodulating a horizontal high frequency band helper signal, demodulation of a horizontal high frequency band helper signal and demodulation of a vertical high frequency band helper signal;
   (3) first D/A conversion means for converting a luminance signal and color signals outputted from said first signal processing means;
   (4) first clock generation means for generating a first clock signal synchronizing with said color burst signal and operating said first A/D conversion means, said first signal processing means and said first D/A conversion means;
   (5) second A/D conversion means for converting a luminance signal and color signals outputted from said first D/A conversion means into a digital signal synchronizing with a horizontal sync signal;
   (6) second signal processing means for processing of regeneration of a vertical high frequency band helper signal, scanning line interpolation, vertical expansion and double speed conversion;
   (7) second D/A conversion means for converting a luminance signal and color signals outputted from said second signal processing means into analog signals; and
   (8) second clock generation means for generating a second clock signal synchronizing with said horizontal sync signal.

2. An TV signal decoding apparatus as recited in claim 1 wherein:
   first signal processing means comprises:
   (1) three dimensional adaptive type Y/C separation means;
   (2) first demodulation means;
   (3) horizontal high frequency band helper signal separation means;
   (4) subcarrier generation means for demodulating a horizontal high frequency band helper signal; and
   (5) horizontal high frequency band helper signal demodulation means: and wherein
      color signals and a vertical high frequency band helper signal are demodulated at said first demodulation means by time sharing.

3. An EDTV signal decoding apparatus as recited in claim 2 comprising:
   (1) demodulation means input signal selection means for selecting a chrominance signal before color demodulation, when either a) an input signal has no vertical high frequency band helper signal or b) the input signal has a vertical high frequency band helper signal and the present instant is in a picture period and
   selecting the input signal before Y/C separation, when the input signal has a vertical high frequency band helper signal and the present instant is in upper/lower non-picture periods; and
   (2) luminance signal output selection means for selecting a luminance signal separated at said three dimensional adaptive type Y/C separation means, when either a) the input signal has no vertical high frequency band helper signal or b) the input signal has a vertical high frequency band helper signal and the present instant is in a picture period and selecting an I signal when the input signal has a vertical high frequency band helper signal and the present instant is in upper/lower non-picture periods.

4. A TV signal decoding apparatus as recited in claim 3 wherein:

luminance signal output selection means selects a demodulated Q signal, when an input signal has a vertical high frequency band helper signal and the present instant is in upper/lower non-picture periods.

5. An EDTV signal decoding apparatus as recited in claim 2 comprising:

color signal output selection means for selecting demodulated color signal outputs, when either a) an input signal has no vertical high frequency band helper signal or b) the input signal has a vertical high frequency band helper signal and the present instant is in a picture period and selecting DC level signals without color signal, when the input signal has a vertical high frequency band helper signal and the present instant is in upper/lower non-picture periods.

6. An TV signal decoding apparatus as recited in claim 1 wherein:

first signal processing means comprises
  (1) three dimensional adaptive type Y/C separation means;
  (2) color demodulation means;
  (3) horizontal high frequency band helper signal separation means;
  (4) subcarrier generation means for demodulating a horizontal high frequency band helper signal; and
  (5) second demodulation means: and wherein
    a horizontal high frequency band helper signal and a vertical high frequency band helper signal are demodulated at said second demodulation means by time sharing.

7. AN EDTV signal decoding apparatus as recited in claim 5 comprising:

(1) demodulation means input signal selection means for selecting a chrominance signal separated at said three dimensional adaptive type Y/C separation means, when either a) an input signal has no vertical high frequency band helper signal or b) the input signal has a vertical high frequency band helper signal and the present instant is in a picture period and selecting the input signal before Y/C separation, when the input signal has a vertical high frequency band helper signal and the present instant is in upper/lower non-picture periods;

(2) luminance signal output selection means for selecting a luminance signal separated at said three dimensional adaptive type Y/C separation means, when either a) the input signal has no vertical high frequency band helper signal or b) the input signal has a vertical high frequency band helper signal and the present instant is in a picture period and selecting an output signal of said demodulation means, when the input signal has a vertical high frequency band helper signal and the present instant is in upper/lower non-picture periods; and (3) subcarrier selection means for selecting a color subcarrier signal, when the input signal has a vertical high frequency band helper signal and the present instant is in upper/lower non-picture periods and selecting a signal having a frequency of 16/7 times of a color subcarrier, when either a) the input signal has no vertical high frequency hand helper signal or b) the input signal has vertical high frequency band helper signal and the present instant is in a picture period.

8. An EDTV signal decoding apparatus as recited in claim 6 comprising:

color signal output selection means for selecting demodulated color signal outputs, when either a) an input signal has no vertical high frequency band helper signal or b) the input signal has a vertical high frequency band helper signal and the present instant is in a picture period and selecting DC level signals without color signal, when the input signal has a vertical high frequency band helper signal and the present instant is in upper/lower non-picture periods.

\* \* \* \* \*

UNITED STATES PATENT AND TRADE MARK OFFICE
CERTIFICATE OF CORRECTION

PATENT NO. : 5,510,847
DATED : April 23, 1996
INVENTOR(S) : Nio et al.

It is certified that error appears in the above-identified patent and that said Letters Patent is hereby corrected as shown below:

Column 7, line 64, "TV" should be --EDTV--.

Column 8, line 33, "TV" should be --EDTV--.

Column 9, line 4, "TV" should be --EDTV--.

Column 9, line 23, "TV" should be --EDTV--.

Signed and Sealed this

Tenth Day of December, 1996

Attest:

BRUCE LEHMAN

*Attesting Officer*  *Commissioner of Patents and Trademarks*